United States Patent
Brunner (10) Patent No.: US 9,064,542 B1
(45) Date of Patent: Jun. 23, 2015

(54) SCHEDULED LOAD OF HEADS TO REDUCE LUBRICANT MIGRATION ON POLE TIP AND DECREASE TIME TO READY

(71) Applicant: Western Digital Technologies, Inc., Irvine, CA (US)

(72) Inventor: Ralf Brunner, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/903,464

(22) Filed: May 28, 2013

Related U.S. Application Data (60) Provisional application No. 61/809,805, filed on Apr. 8, 2013.

(51) Int. Cl.
  *G11B 21/02* (2006.01)
  *G11B 21/21* (2006.01)

(52) U.S. Cl.
  CPC ..................... *G11B 21/21* (2013.01)

(58) Field of Classification Search
  None
  See application file for complete search history.

(56) References Cited

U.S. PATENT DOCUMENTS

| | | | |
|---|---|---|---|
| 4,490,766 A | 12/1984 | Hill et al. | |
| 5,850,321 A | 12/1998 | McNeil et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,084,753 A * | 7/2000 | Gillis et al. | 360/128 |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,108,157 A * | 8/2000 | Yoneda et al. | 360/75 |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |
| 6,337,778 B1 | 1/2002 | Gagne | |
| 6,356,405 B1 | 3/2002 | Gui et al. | |

(Continued)

*Primary Examiner* — K. Wong (57) ABSTRACT

A disk drive includes: a disk, a head, and control circuitry including a servo control system operable to actuate the head. The head is unloaded onto a ramp for a period of time based on a time constant. The head is loaded onto the disk after the period of time has elapsed and head-media spacing (HMS) is repeatedly measured. The head is unloaded when the HMS measurements become constant within a predetermined range.

24 Claims, 10 Drawing Sheets

(56) References Cited

U.S. PATENT DOCUMENTS

| | | |
|---|---|---|
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,168 B1 | 12/2002 | French et al. |
| 6,493,173 B1 | 12/2002 | Kim et al. |
| 6,493,184 B1 | 12/2002 | Smith |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,760,175 B2 | 7/2004 | Smith |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,768 B2 * | 2/2006 | Marchon et al. .............. 360/75 |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |

(56) References Cited

U.S. PATENT DOCUMENTS

| | | |
|---|---|---|
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,230,780 B2 * | 6/2007 | Suk .................. 360/31 |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,009,380 B2 * | 8/2011 | Matsushita et al. .......... 360/75 |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |

(56) References Cited

U.S. PATENT DOCUMENTS

| | | |
|---|---|---|
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,817,413 B1 * | 8/2014 | Knigge et al. .................. 360/75 |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

* cited by examiner

SCHEDULED LOAD OF HEADS TO REDUCE LUBRICANT MIGRATION ON POLE TIP AND DECREASE TIME TO READY

CROSS REFERENCE TO RELATED APPLICATION

This U.S. patent application is based on and claims the benefit of priority under 35 U.S.C. 119 from provisional U.S. patent application No. 61/809,805, filed on Apr. 8, 2013, the entire disclosure of which is incorporated by reference herein.

BACKGROUND

Disk drives comprise a disk media and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the velocity of the actuator arm as it seeks from track to track.

Figure 1:
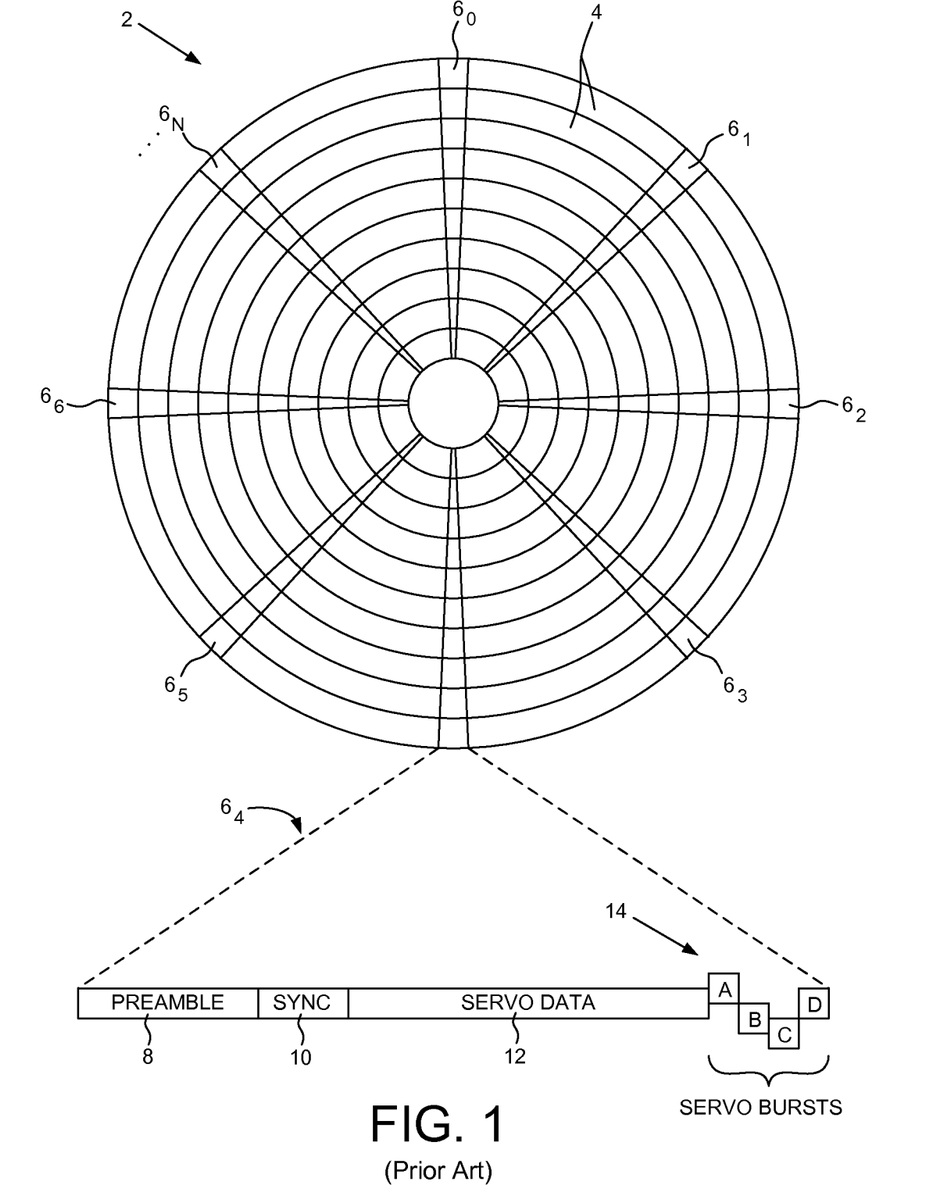
FIG. 1 shows a prior art disk format having a plurality of servo tracks defined by embedded servo sectors.

FIG. 1 shows a prior art disk format 2 comprising a number of servo tracks 4 defined by concentric servo sectors $6_0$-$6_N$ recorded around the circumference of each servo track, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

An air bearing forms between the head and the disk due to the disk media rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. A dynamic fly height (DFH) servo controller may measure the fly height of the head and adjust the fly height actuator to maintain a target fly height during write/read operations.

In certain circumstances, lubricant on the disk media can build up on the head, causing high fly writes (HFW) due to increased head-media spacing (HMS). For example, if the head is parked on the ramp over an extended period of time (e.g., over one hour) then the lubricant may migrate from pooling areas back onto the air bearing system and the pole tip, which can result in a head-media spacing change that can cause HFW after initial loading of the heads back onto the media.

DETAILED DESCRIPTION OF EXAMPLE EMBODIMENTS

Some example embodiments described herein involve apparatuses and methods for determining or measuring the effect of parking the head on the ramp over an extended period of time, and scheduling a load and unload procedure for the disk drive to remove or shear off lubricant which may have migrated from the disk to the pole area of the head. Removing lubricant from the pole area of the head may result in decreasing the time-to-ready for the disk drive as well as preventing HFW. In the present application, "a head" and "the head" are not meant to be limited to one head, but can also be applied to one or more heads of the HDD, depending on the desired implementation.

Figure 2A:
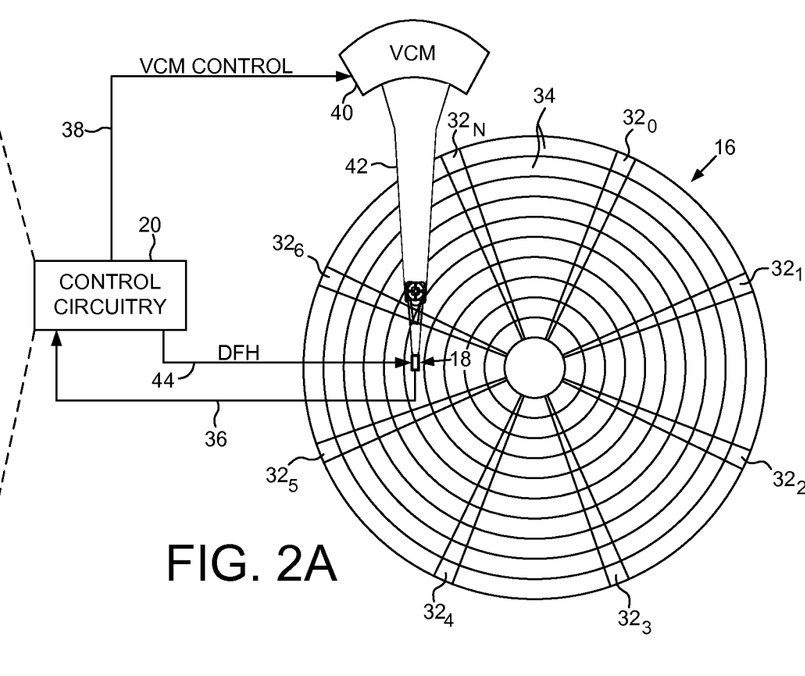
FIG. 2A shows a disk drive according to an example embodiment of the present inventive concept, having a head actuated over a disk by a servo control system.

FIG. 2A shows a disk drive according to an example embodiment of the present inventive concept, having a disk 16, a head 18, and control circuitry 20 including a servo control system operable to actuate the head 18 over the disk 16. The disk 16 includes embedded servo sectors $32_0$-$32_N$ that define a plurality of servo tracks 34. The control circuitry 20 executes the flow diagram of FIG. 2B. The operations in FIG. 2B may be implemented, for example, in the hard drive firmware. When the hard disk drive is in operation, the heads are flying over the lubricated disk. Lubricant may be picked up by the head and may pool in certain areas on the head. When the hard drive is not in use, the head is unloaded and parked on the ramp, wherein lubricant may flow back onto the pole tip area (22). During this time, the lubricant may migrate from the pooling area back onto the air bearing slider and the pole area, which may increase the HMS. As a result of the lubricant migration, once the head is loaded back onto the disk, HFW may occur along with other issues, for example, longer time-to-ready for the disk drive. Thus, in order to eliminate the lubricant build up on the pole area of the unloaded head, after a period of time has elapsed based on a set time constant, the head is loaded to perform HMS measurements (24). The head is loaded periodically based on the set time constant to shear off the excess lubricant from the pole area. HMS measurements are performed until the HMS measurements become constant based on a desired HMS, which indicates that the migrated lubricant is cleaned off (26). When the HMS measurements become constant, the head is unloaded and parked on the ramp (28). The time constant may be adjusted based on the time taken for the HMS measurements to become constant (e.g., based on the read signal feedback) (30). Adjustment of the time constant can thereby allow the control circuitry to account for changes in environmental conditions (e.g., temperature changes, moisture, etc.), or variations in disk drive design. Further details are provided in the description of FIG. 5 below.

Figure 2B:
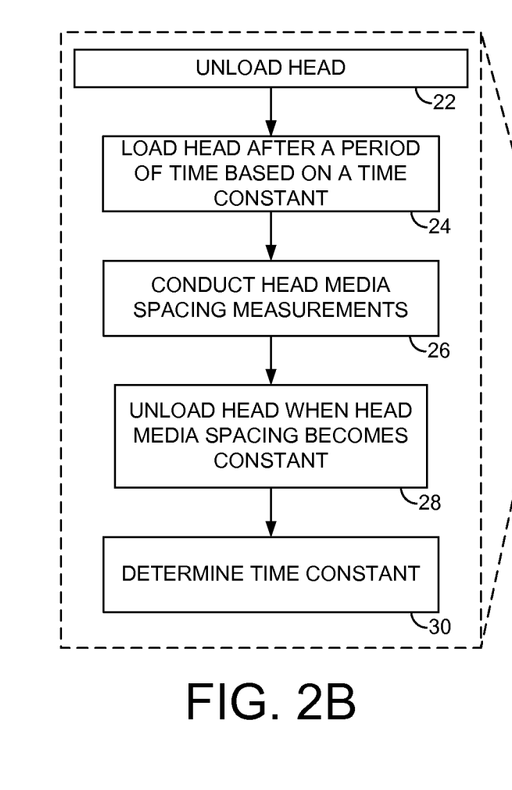
FIG. 2B is a flow diagram according to an example embodiment of the present inventive concept, where a scheduled load procedure is performed to remove or shear off the migrated lubricant from the pole area.

In the example embodiment of FIG. 2A, the disk 16 comprises embedded servo sectors $32_0$-$32_N$ that define a plurality of servo tracks 34. The control circuitry 20 processes HMS measurements 36 from the head 18 to implement the flow diagram as shown in FIG. 2B. The control circuitry 20 generates a control signal 38 applied to a voice coil motor (VCM) 40 which rotates an actuator arm 42 about a pivot in order to actuate the head 18 to load the head to fly over the disk and to unload the head and park the head on a ramp.

Figure 3:
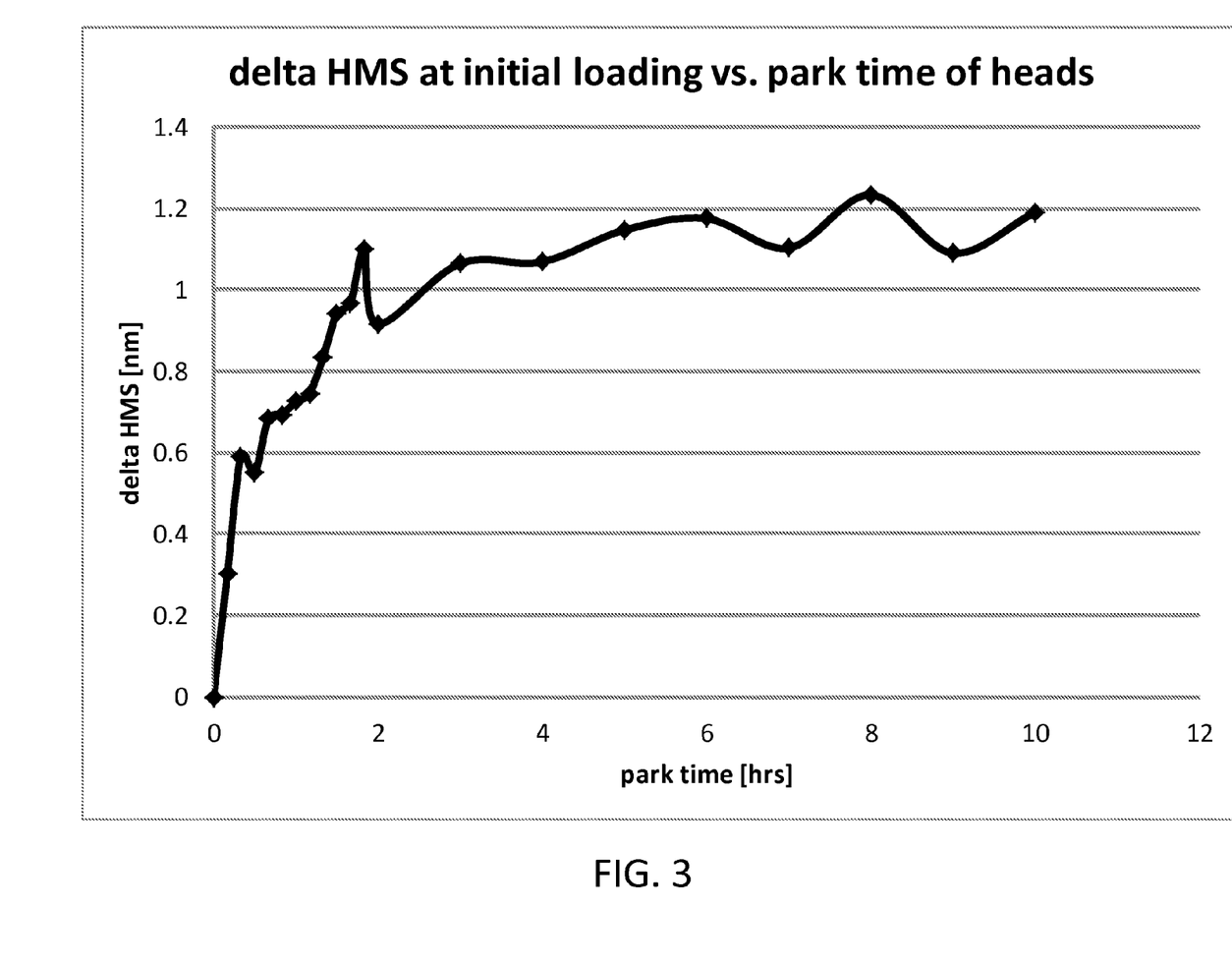
FIG. 3 illustrates a graph of the change in HMS versus the park time of the head.

FIG. 3 illustrates a graph of the change in HMS versus the park time of the head. As the park time of the head increases, the delta for the HMS also increases. As illustrated in FIG. 3, a park time of three hours may result in the HMS being over 1 nm. In example embodiments, the set time constant may be configured to not exceed three hours, as the HMS will tend to exceed 1 nm after three hours, which may require a loading time of roughly thirty minutes or more to shear off the excess lubricant, as illustrated in FIG. 4(d). In an example situation where the HDD may be powered down and the head may be parked, such as a server utilizing the HDD, the HDD can be configured to power on for the loading the head onto the disk media after a period of time has elapsed based on the set time constant, wherein the server or control circuitry of the HDD can monitor the time period to ensure that the head does not remain parked for more than three hours. However, depending on the desired implementation of the HDD, other configurations are also possible. For example, in a Redundant Array of Independent Disks (RAID) configuration or a tiered storage configuration wherein the HDD may be utilized only as a secondary storage with a set or known backup schedule, a maximum park time of five hours, for example, could also be employed.

FIGS. 4(a) to 4(f) are a series of graphs illustrating the decrease in the HMS versus time after initial load, in accordance with an example embodiment. The graphs illustrate the change in HMS versus time after initial load for a head that was parked on a ramp for 0 hrs, 1 hr, 2 hrs, 3 hrs, 5 hrs and 10 hrs, respectively.

Figure 4A:
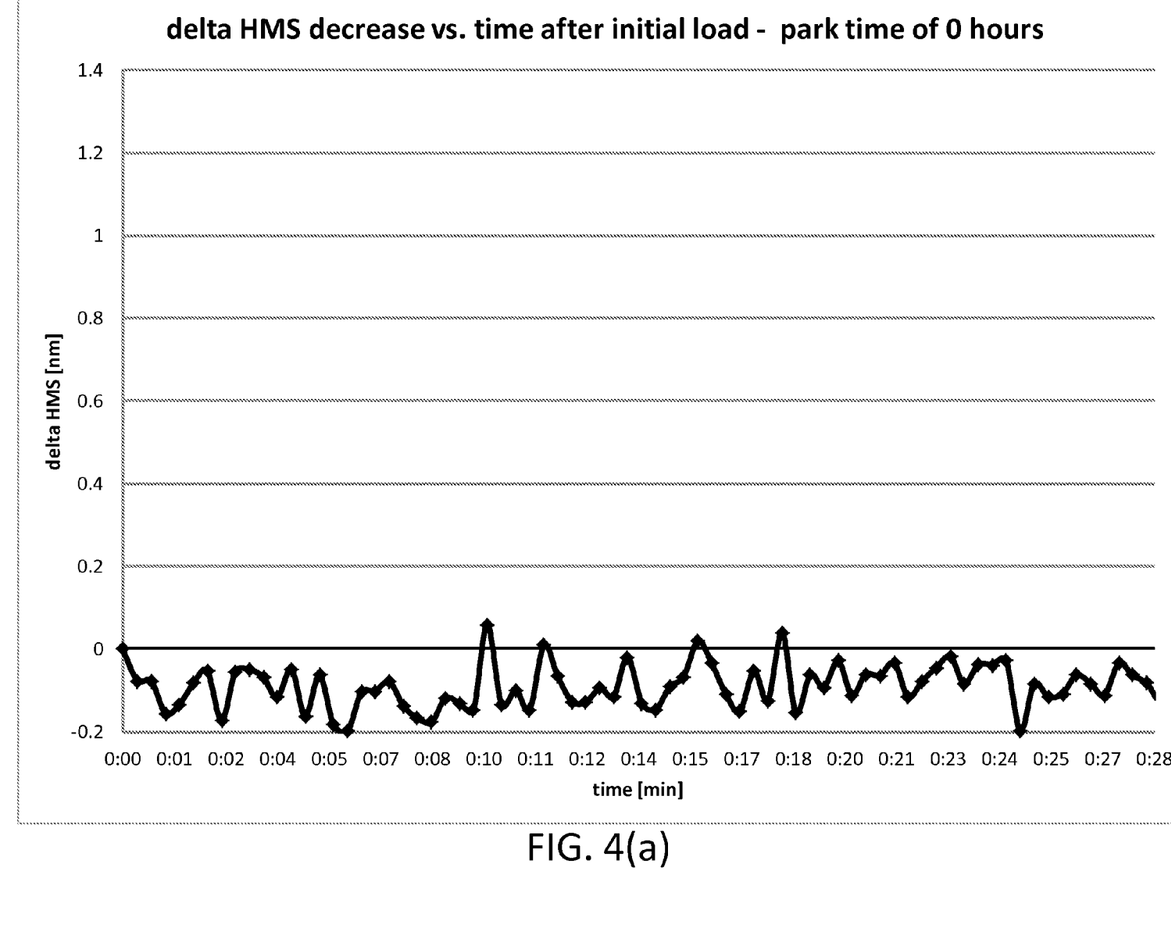
FIGS. 4(a) to 4(f) illustrate a graph of the decrease in the HMS versus time after initial load, in accordance with an example embodiment.

In the example of FIG. 4(a) the head is loaded almost immediately onto the disk (e.g. under one minute) after being unloaded from the disk and parked on the ramp. As illustrated in FIG. 4(a), the HMS measurements are constant within a measurement error (e.g. 0.2 nm). In example embodiments, a predetermined range can be configured to compensate for such measurement error, so that the implementations can determine that the HMS measurements are constant when they fall within the predetermined range. The predetermined range can be configured manually, and/or can be derived from initial HMS measurements taken from loading the head immediately onto the disk for calibration (e.g., based on the measurement error), or by other methods depending on the desired implementation.

For long periods of unload where the head is parked on the ramp (e.g. 1 hr or more), the resulting increase in HMS may be up to 1 nm or more from the designated HMS of the disk drive. The head is therefore loaded until the increased HMS is reduced to zero, plus or minus a delta for measurement variance. The delta can be configured based on the design of the disk drive and the desired implementation.

Figure 4B:
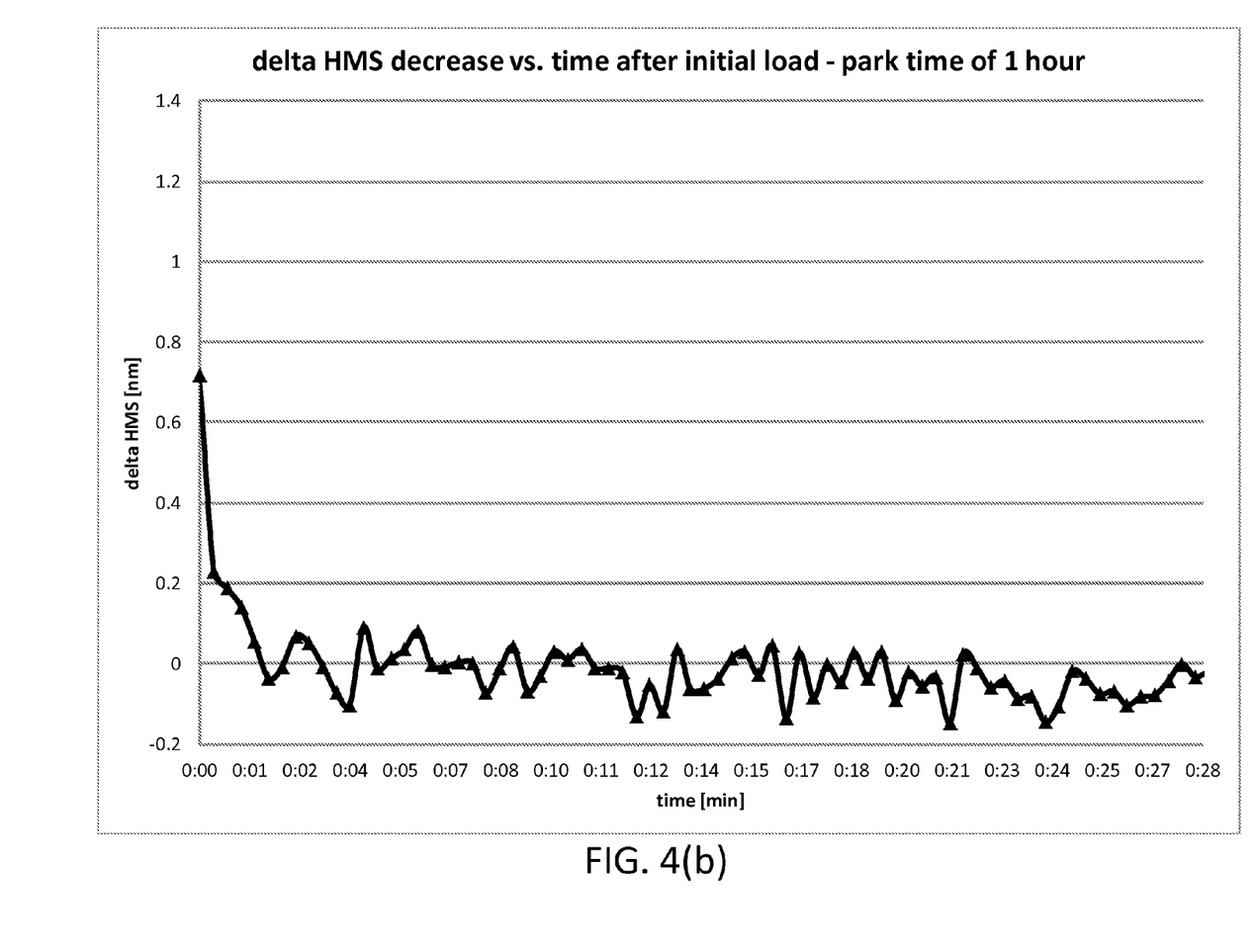
Figure 4C:
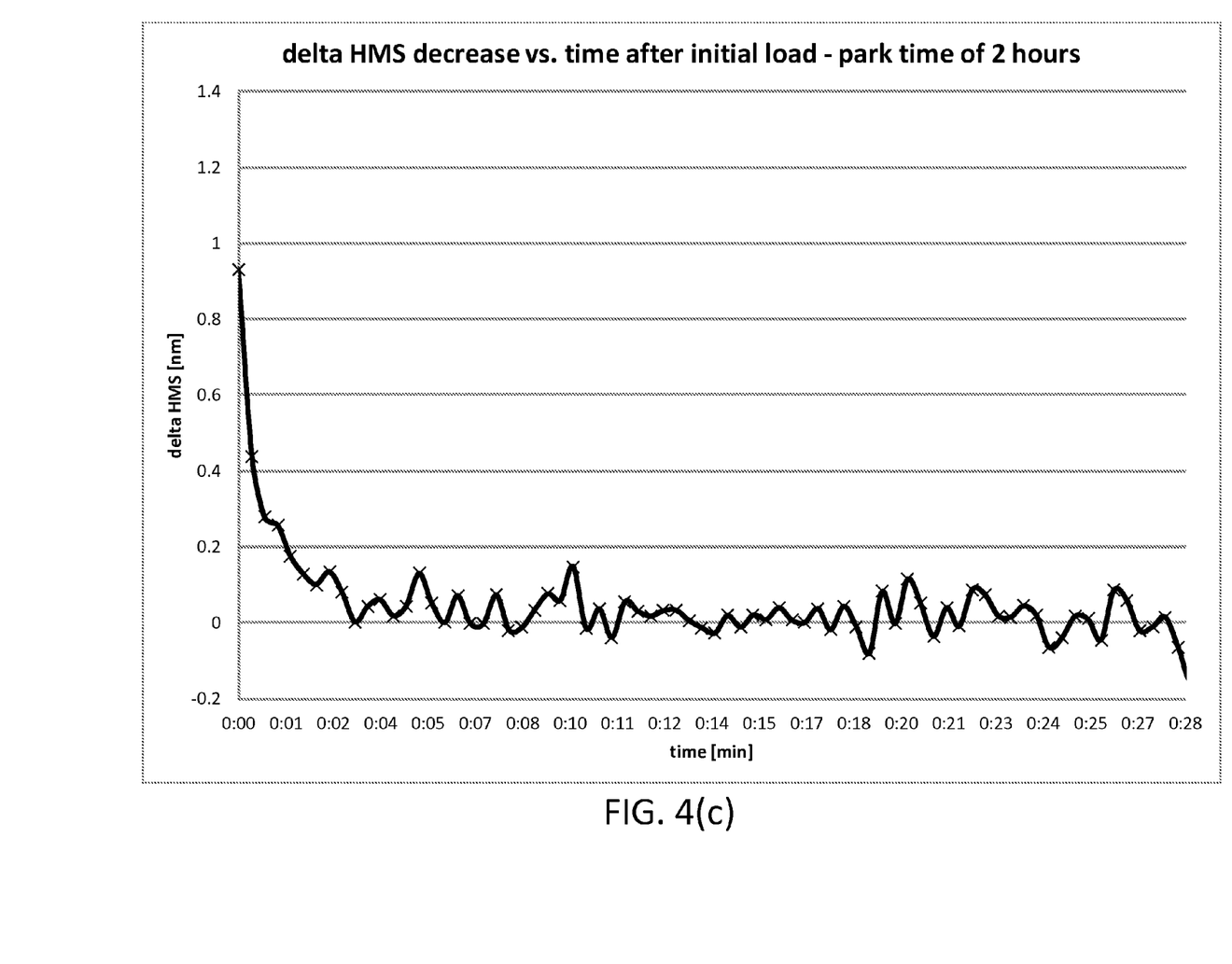
Figure 4D:
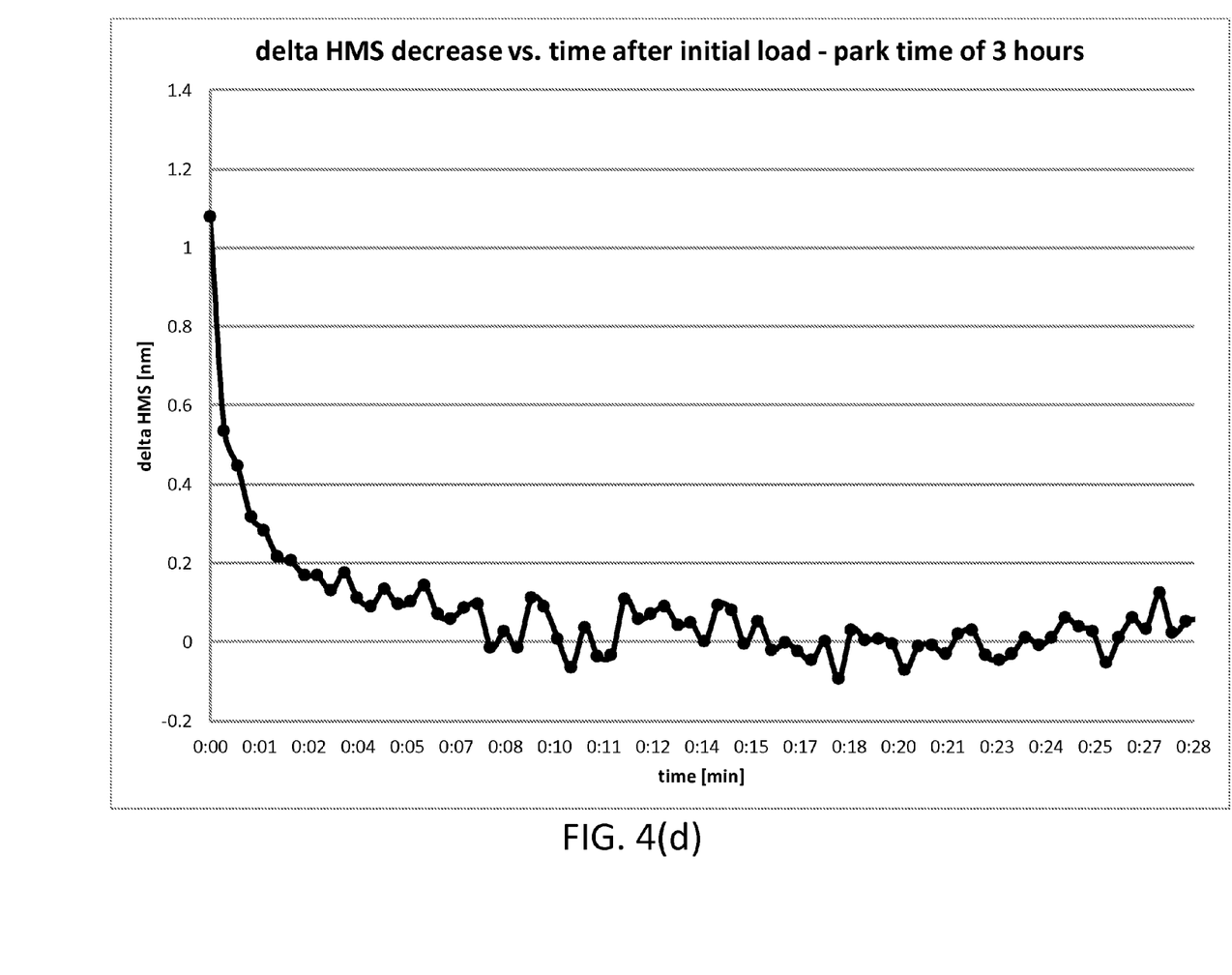
Figure 4E:
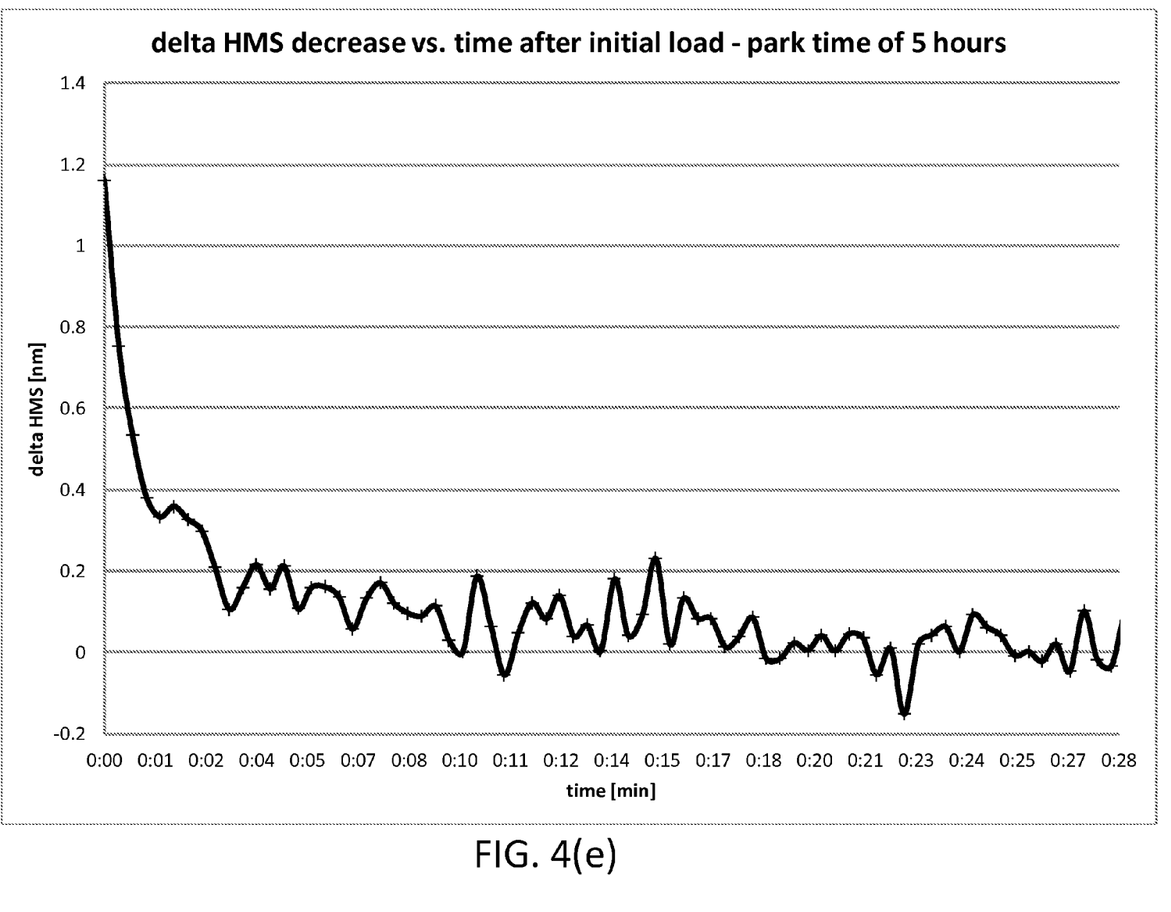
Figure 4F:
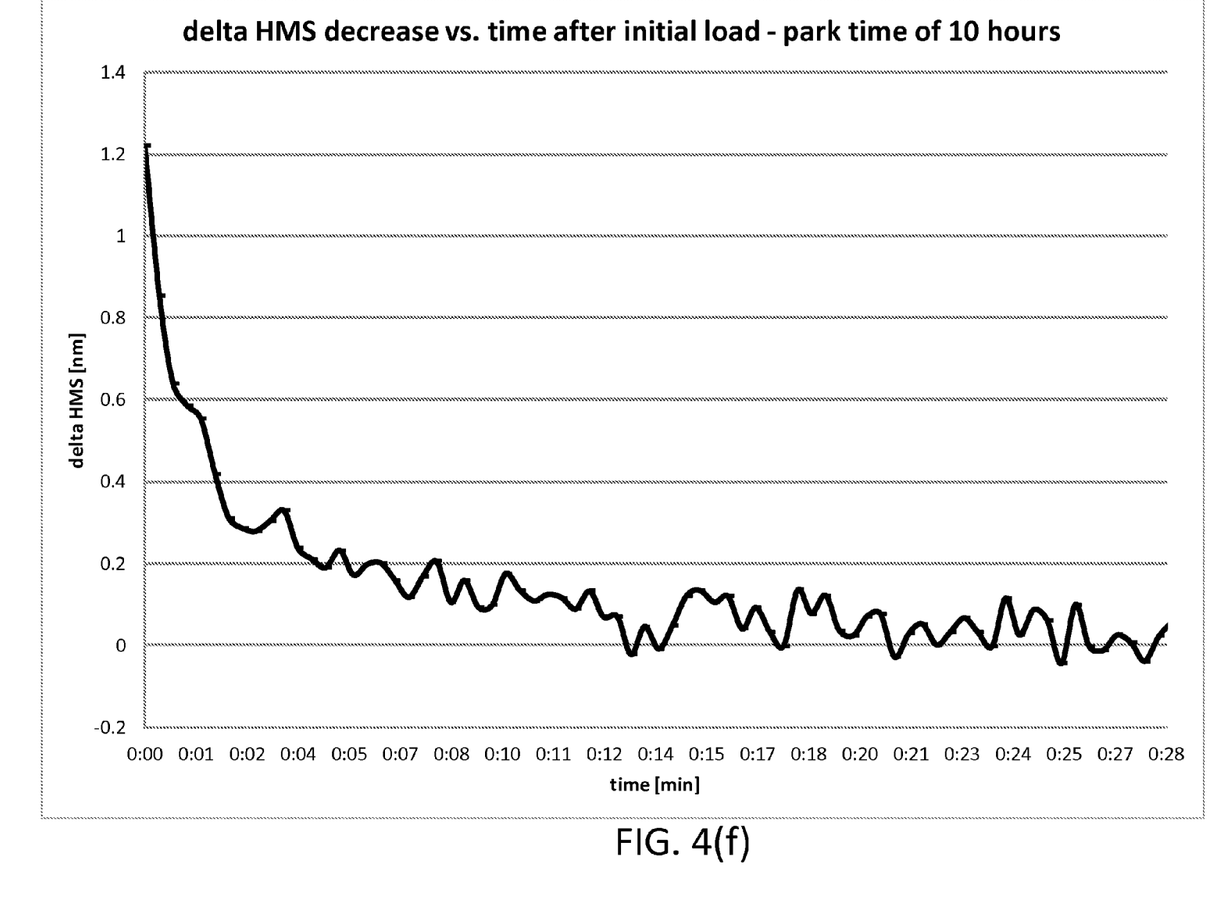

As illustrated in FIG. 4(b), parking the head on the ramp for 1 hr or less (e.g. 10-20 minutes) can reduce the increase in HMS, thereby reducing the time needed for the HMS measurements to become constant. For example, setting the time period for unloading the head for 10-20 minutes may require loading the head for only 30 seconds for shearing off the lubricant. For implementations where time periods of 1 hr or more are required (e.g. drive design, intended implementation of the disk drive, etc.), the time needed to reduce the HMS measurements may be longer (e.g., several minutes). As illustrated in FIGS. 4(c) to 4(f), a longer park time results in a larger initial difference in HMS, which may necessitate a longer loading period for the HMS values to become constant within the predetermined range. For example, as illustrated in FIG. 4(d), a park time of three hours could require roughly ten minutes or more to reduce the HMS measurements to the predetermined range.

Figure 5:
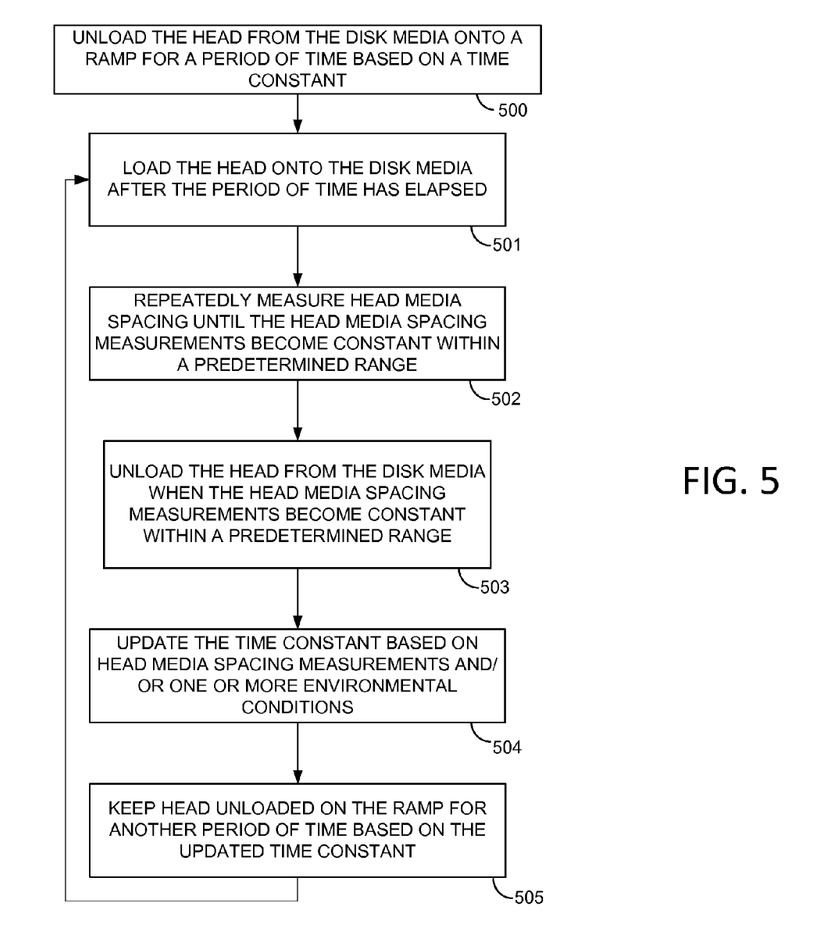
FIG. 5 illustrates a flow diagram of an example embodiment of the present inventive concept.

FIG. 5 illustrates a flow diagram according to an example embodiment of the present inventive concept. At 500, the head of the HDD is unloaded from the disk media onto a ramp for a period of time based on a time constant as explained above. At 501, the head is loaded onto a disk media of the HDD after the period of time has elapsed. At 502, HMS is repeatedly measured until the HMS measurements become constant within a predetermined range. The measurements can be conducted, for example by a direct measurement of HMS from sensors or feedback from control circuitry. For example, a comparison of a read back signal strength from the head with a baseline read back signal strength can also be used to determine the HMS. As the read back signal strength is decreased, the control circuitry can determine the HMS based on the decreased read back signal strength due to a pre-determined correlation between the signal strength and the HMS. In another example implementation, the read back signal strength after the heads were loaded for a long period of time (e.g., 30 min or more) can be used as the HMS measurement, without having to determine the actual HMS. In this example implementation, because the baseline signal strength is known (e.g., preset in the control circuitry or predetermined from an example calibration measurement as described with respect to FIG. 4(a)), the read back signal strength can be measured and the head can be unloaded until the read back signal strength falls within a predetermined range of the baseline read back signal strength.

At 503, the head is unloaded from the disk media when the HMS measurements are constant within the predetermined range. At 504, the time constant is updated based on the HMS measurements and/or one or more environmental conditions. Various environmental conditions may also affect the lubricant migration. For example, depending on the lubricant, lower temperatures may affect the viscosity of the lubricant, thereby requiring more time to shear off the lubricant than in a room temperature or warmer environment. Therefore, a temperature sensor may be employed to shorten the time constant if the temperature falls below a threshold for which the lubricant may shear off more slowly due to the lowered viscosity of the lubricant. In another example implementation where a vibration sensor is employed, the head may not be loaded immediately until the vibration conditions fall below a preset threshold to avoid damage to the disk media, even when the period of time based on the time constant has elapsed. Other configurations involving environmental conditions may also be employed, depending on the desired implementation. At 505, the head is kept unloaded on the ramp for another period of time based on the updated time constant, wherein the flow repeats from 501.

In another example implementation, a predetermined baseline HMS can also be used for direct comparison with the measured HMS to determine the time constant. The predetermined baseline HMS can be used with the predetermined range to ensure that the HMS is within a range of the baseline. If the measured HMS is compared to the predetermined baseline HMS to adjust the time constant, there may be a problem with signal degradation over time. In such implementations, the control circuitry can be further configured to adjust the baseline HMS to account for any signal degradation not related to lubricant migration over the head (e.g. contamination or wear in the head/disk interface). Once the measured HMS is constant over a period of time, the control circuitry can be configured using this value as the new predetermined HMS.

Any suitable control circuitry may be employed to implement the flow diagrams in the example embodiments of the present invention, such as any suitable integrated circuit or circuits. For example, the control circuitry may be implemented within a read channel integrated circuit, or in a component separate from the read channel, such as a disk controller, or certain actions described above may be performed by a read channel and others by a disk controller. In one example embodiment, the read channel and disk controller are implemented as separate integrated circuits, and in an alternative example embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one example embodiment, the control circuitry comprises a microprocessor executing instructions, the instructions being operable to cause the microprocessor to perform the actions of the flow diagrams described herein. In some embodiments, certain actions may be omitted, combined, and/or performed in a different order than shown here. The instructions may be stored in any computer-readable medium. In one example embodiment, they may be stored on a non-volatile semiconductor memory external to the microprocessor, or integrated with the microprocessor in a SOC. In another example embodiment, the instructions are stored on the disk media and read into a volatile semiconductor memory when the disk drive is powered on. In yet another example embodiment, the control circuitry comprises suitable logic circuitry, such as state machine circuitry.

What is claimed is:

1. A disk drive comprising:
    a disk media;
    a head; and
    control circuitry comprising a servo control system configured to actuate the head for reduction of lubricant migration, the control circuitry configured to:
        unload the head onto a ramp for a period of time based on a time constant;
        load the head onto the disk after the period of time has elapsed;
        repeatedly measure head-media spacing (HMS) until HMS measurements become constant within a predetermined range; and
        unload the head when the HMS measurements become constant within a predetermined range.

2. The disk drive of claim 1, wherein the control circuitry is further configured to update the time constant based on a time taken for the HMS measurements to become constant within the predetermined range.

3. The disk drive of claim 2, wherein the control circuitry is configured to unload the head when the HMS measurements become constant within the predetermined range for another period of time based on the updated time constant.

4. The disk drive of claim 1, wherein the control circuitry is configured to measure HMS by comparison of a read back signal strength from the head with a baseline read back signal strength.

5. The disk drive of claim 1, wherein the control circuitry is configured to update the time constant based on one or more environmental conditions.

6. The disk drive of claim 1, wherein the period of time is configured to be less than three hours.

7. The disk drive of claim 1, wherein the control circuitry is further configured to update a predetermined baseline HMS after the head is loaded for another period of time and repeatedly measure the HMS until the HMS measurements become constant.

8. The disk drive of claim 7, wherein the another period of time is at least thirty minutes.

9. A method for mitigating lubricant migration onto a pole area of a slider in a hard disk drive (HDD), the method comprising:
    unloading a head of the HDD onto a ramp for a period of time based on a time constant;
    loading the head onto a disk media of the HDD after the period of time has elapsed;
    repeatedly measuring head-media spacing (HMS) until HMS measurements become constant within a predetermined range; and
    unloading the head when the HMS measurements become constant within the predetermined range.

10. The method of claim 9, further comprising updating the time constant based on a time taken for the HMS measurements to become constant within the predetermined range.

11. The method of claim 10, wherein the unloading the head when the HMS measurements become constant within the predetermined range is for another period of time based on the updated time constant.

12. The method of claim 9, wherein the measuring HMS comprises comparing a read back signal strength from the head with a baseline read back signal strength.

13. The method of claim 9, further comprising updating the time constant based on one or more environmental conditions.

14. The method of claim 9, wherein the period of time is configured to be less than three hours.

15. The method of claim 9, further comprising updating a predetermined baseline HMS after the head is loaded for another period of time and repeatedly measuring the HMS until the HMS measurements become constant.

16. The method of claim 15, wherein the another period of time is at least thirty minutes.

17. A control circuitry configured to actuate a head of a hard disk drive (HDD) for reduction of lubricant migration, the control circuitry configured to:
    unload the head of the hard disk drive (HDD) onto a ramp for a period of time based on a time constant;
    load the head onto a disk media of the HDD after the period of time has elapsed;
    repeatedly measure head-media spacing (HMS) until HMS measurements become constant within a predetermined range; and
    unload the head when the HMS measurements become constant within a predetermined range.

18. The control circuitry of claim 17, wherein the control circuitry is further configured to update the time constant based on a time taken for the HMS measurements to become constant within the predetermined range.

19. The control circuitry of claim 18, wherein the control circuitry is configured to unload the head when the HMS measurements become constant within the predetermined range for another period of time based on the updated time constant.

20. The control circuitry of claim 17, wherein the control circuitry is configured to measure HMS by comparison of a read back signal strength from the head with a baseline read back signal strength.

21. The control circuitry of claim 17, wherein the control circuitry is configured to update the time constant based on one or more environmental conditions.

22. The control circuitry of claim 17, wherein the period of time is configured to be less than three hours.

23. The control circuitry of claim 17, wherein the control circuitry is further configured to update a predetermined baseline HMS after the head is loaded for another period of time, and repeatedly measure the HMS until the HMS measurements become constant.

24. The control circuitry of claim 23, wherein the another period of time is at least thirty minutes.

* * * * *